United States Patent [19]
Toyohara

[11] Patent Number: 5,815,609
[45] Date of Patent: Sep. 29, 1998

[54] WAVEGUIDE TYPE OPTICAL EXTERNAL MODULATOR

[75] Inventor: Atsushi Toyohara, Tokyo, Japan

[73] Assignee: NEC Corporation, Tokyo, Japan

[21] Appl. No.: 706,532

[22] Filed: Sep. 4, 1996

[30] Foreign Application Priority Data

Sep. 13, 1995 [JP] Japan ................................. 7-235036

[51] Int. Cl.$^6$ ................................................. G02B 6/126
[52] U.S. Cl. ................................................. 385/2; 385/40
[58] Field of Search ............................... 385/1–4, 8, 9, 385/40, 41

[56] References Cited

U.S. PATENT DOCUMENTS

| | | | |
|---|---|---|---|
| 4,861,126 | 8/1989 | Dautartas et al. | 385/40 |
| 5,153,934 | 10/1992 | Okayama et al. | 385/40 |
| 5,479,552 | 12/1995 | Kitamura et al. | 385/40 X |
| 5,483,609 | 1/1996 | Nakaya | 385/2 X |

FOREIGN PATENT DOCUMENTS

| | | |
|---|---|---|
| 55-117108 | 9/1980 | Japan . |
| 3-252619 | 11/1991 | Japan . |
| 4-263224 | 9/1992 | Japan . |
| 4-350826 | 12/1992 | Japan . |

*Primary Examiner*—John D. Lee
*Attorney, Agent, or Firm*—Young & Thompson

[57] ABSTRACT

A waveguide type optical device includes a lithium niobate substrate, a Ti diffused waveguide formed in the substrate, an electrode formed on the waveguide for applying an electric field to the waveguide, a first buffer layer made of $SiO_2$ and formed as a film between the electrode and the waveguide, and a second buffer layer made of Si and formed as a film in a region including at least part of the waveguide above the first buffer layer.

12 Claims, 6 Drawing Sheets

WAVEGUIDE TYPE OPTICAL EXTERNAL MODULATOR

BACKGROUND OF THE INVENTION

1. Field of the Invention

This invention relates to a waveguide type optical device for use with, for example, optical communications, and more particularly to a waveguide type optical device which employs a substrate having an electro-optical effect or a thermo-optical effect to perform modulation, switching and so forth of incoming light.

2. Description of the Related Art

A waveguide type optical device employs a substrate having an electro-optical effect. In the substrate, a portion having a higher refractive index is formed as a waveguide, and a pair of electrodes for applying a voltage are formed on or in the proximity of the waveguide. The waveguide type optical device can modulate the phase or the intensity of light or can switch the path of light by applying an electric field to the waveguide using the electrodes to vary the refractive index of the waveguide.

First, as an example of a waveguide type optical device, the structure and the operation of an optical modulator is described briefly using an electro-optical effect. Generally, for the substrate of such an optical modulator as just mentioned, a lithium niobate substrate which exhibits a comparatively high electro-optical effect from among various ferrodielectric materials is used. In order to produce a waveguide type optical device which employs lithium niobate ($LiNbO_3$), a titanium film is first formed on a substrate and patterned into a desired waveguide pattern, and then it is heated at a high temperature around 1,000° C. to perform thermal diffusion to form a waveguide. Then, a silicon dioxide buffer layer ($SiO_2$) is formed on the waveguide, and a pair of electrodes are formed from a metal film on the $SiO_2$ film. The $SiO_2$ film has a function as a buffer layer for preventing absorption of light by the electrodes. A silicon film (Si film) is sometimes formed between the silicon dioxide buffer layer and the metal film.

In a waveguide type optical device of the construction described above, it is possible to form circuit elements which have a function of modulating light and another function of switching an optical path as an integrated circuit on the substrate. Since the circuit elements having the functions described above can operate at a high speed, development is directed to a waveguide type optical device which acts as a switch for switching an optical path for an external modulator or an OTDR (Optical Time Domain Reflectmeter) for large capacity optical communications. It is to be noted that the OTDR is a measuring instrument for measuring a breaking point or a propagation loss of, for example, an optical fiber, and an optical switch is employed as a component of the OTDR. As the switching speed of the optical switch increases, the accuracy in measurement of a breaking position or the like increases.

FIG. 1 shows a Mach-Zehnder type optical modulator used conventionally. The Mach-Zehnder type optical modulator has conventionally been an object of research and development widely, and investigations are proceeding in order to achieve practical use of it. Waveguide 13 is formed on a lithium niobate substrate (waveguide substrate) 12 of a Mach-Zehnder type optical modulator 11. Waveguide 13 includes branching portions 13A and 13B at two left and right locations thereof and two parallel waveguide portions (arms) 13C and 13D at a central location thereof, and forms a Mach-Zehnder interferometer. In FIG. 1, two parallel waveguide portions 13C and 13D are hidden by electrodes 15 and 16 and are not shown.

FIG. 2 is a sectional view of the Mach-Zehnder type optical modulator taken along line A–A' of FIG. 1. Two waveguide portions 13C and 13D are formed in the proximity of the surface of waveguide substrate 12, and $SiO2$ film 14 is formed on waveguide portions 13C and 13D over the entire surface of waveguide substrate 12. A pair of electrodes 15 and 16 in the form of a metal layer made of chrome and gold are formed on $SiO_2$ film 14 in a corresponding relationship to waveguide portions 13C and 13D, respectively.

Input side optical fiber 17 and output side optical fiber 18 are optically coupled to each end face of waveguide substrate 12 in FIG. 1. Further, output terminals of driver circuit 19 for applying a voltage between two electrodes 15 and 16 to input a signal are connected to electrodes 15 and 16.

FIG. 3 shows the Mach-Zehnder type optical modulator in a condition wherein a voltage is applied from the driver circuit. By the application of the voltage, an electric field is produced in a longitudinal direction as indicated by arrow marks in FIG. 3 in waveguide portions 13C and 13D formed in waveguide substrate 12. In this condition, the refractive indices of waveguide portions 13C and 13D are varied by an electro-optical effect of lithium niobate. Now, it is assumed that waveguide portions 13C and 13D (hereinafter referred to as waveguide pair) have an equal structure. In waveguide pair 13C and 13D, light is branched once and then joins together.

FIGS. 4 to 6 illustrate various relationships between the applied voltage and the optical output. FIG. 4 illustrates the relationship in the TM mode; FIG. 6 illustrates the relationship in the TE mode; and FIG. 5 illustrates the relationship in a mixed mode of the TM mode and the TE mode. When the voltage applied between two electrodes 15 and 16 is zero, no phase difference is present between two light rays branched by waveguide pair 13C and 13D. Therefore, when the two light rays join each other, the original light is outputted except a propagation loss or a branching loss.

However, if the applied voltage (V) is gradually increased, then the phases of the branched light beams become different from each other by an increasing amount. Then, the phase difference becomes equal to $\pi$ at a certain voltage as indicated by an arrow mark in FIGS. 4 to 6. If the two branched light rays whose phase difference is $\pi$ join each other, then no output light can be measured any more because of the interference of the light rays. The Mach-Zehnder type optical modulator modulates light by switching the voltage applied to two electrodes 15 and 16 in this manner.

Generally, in order to operate the Mach-Zehnder type optical modulator, two different modulation voltages including voltage $V_H$ with which the Mach-Zehnder type optical modulator exhibits a maximum optical output and voltage $V_L$ with which the MachZehnder type optical modulator exhibits a minimum optical output are selectively applied to two electrodes 15 and 16. The modulation voltage (or operating voltage) then is generally represented by $V\pi$ and is given by the magnitude of $|V_H-V_L|$. Further, in order to achieve efficient modulation, bias voltage $V_B$ is applied in a superposed relationship to $V\pi$ to operate the Mach-Zehnder type optical modulator. This bias voltage $V_B$ is given by the following equation (1):

$$V_B=(V_H-V_L)/2 \tag{1}$$

If the polarization mode of incoming light to the Mach-Zehnder type optical modulator is classified, as seen in FIGS. 4 to 6, into three modes including (1) only the TM mode, (2) a mixed mode of the TM mode and the TE mode and (3) only the TE mode, then the relationship between the applied voltage and the optical output exhibits such variations as seen in FIGS. 4 to 6. As seen from FIGS. 4 and 6, when only TM light is inputted, the quenching ratio exhibits its peak with a voltage approximately one third that when only TE light is inputted. Accordingly, in order to allow low voltage driving, incoming light is conventionally adjusted so that it has the TM mode so as to perform a modulation operation of a waveguide type optical device.

In a Mach-Zehnder type optical modulator as a waveguide type optical device for modulating light at a high speed in this manner, the TM mode is used for the polarization of incoming light in order to minimize modulation voltage $V\pi$. Meanwhile, it is a common practice to employ a light source which has a high polarization quenching ratio as a ratio between components of the TE mode and the TM mode and optically connect the light source and an end face of a waveguide to each other by means of a polarization maintaining fiber (PMF). If it is tried to input only a component of the TM mode to the waveguide type optical device, then it is required to stably hold the major axis of the polarization maintaining fiber vertically or horizontally with respect to the waveguide. With such arrangement and construction, it is theoretically possible to input only a component of the TM mode to the waveguide. However, there is the possibility that the polarization quenching ratio may be deteriorated by external factors such as a shift of a location at which the angles of the major axes are adjusted to each other, a variation in temperature of the circumferential environment or application of a stress to the polarization maintaining fiber. If the polarization quenching ratio is deteriorated, then a distortion in modulation waveform is invited, resulting in deterioration of the transmission quality.

One of possible solutions to the problem described above employs a polarizer according to Japanese Patent No. 1,351,184 (Japanese Patent Laid-Open Application No. Showa 55-117108) for an incoming end of a waveguide to cut the TE mode. The polarizer is manufactured and sold under the trade name of "Lamipole" by Sumitomo Ohsaka Cement Company, and also a waveguide type optical device which employs the polarizer is manufactured as an LN modulator (product code "T·MZ1.5–10" and so forth) by Sumitomo Ohsaka Cement Company. However, the waveguide type optical device of the type just described has a problem in that the performance in manufacture is not high as the polarizer must be adhered to the input end of the waveguide.

It is to be noted that, although a technique of adding an impurity for decreasing the refractive index to electrodes of a Mach-Zehnder type optical modulator is disclosed in Japanese Patent Laid-Open Application No. Heisei 3-252619, this is directed to realization of optimum light confining conditions for individual portions of a waveguide to achieve reduction in the total length of the device, but is not directed to cutting or reduction of the TE mode.

SUMMARY OF THE INVENTION

Accordingly, it is an object of the present invention to provide an waveguide guide optical device which can attenuate only a component of the TE mode of light which propagates in a waveguide.

According to the present invention, a waveguide type optical device comprises (a) a lithium niobate substrate, (b) a Ti diffused waveguide formed in the lithium niobate substrate, (c) an electrode formed on the Ti diffused waveguide for applying an electric field to the Ti diffused waveguide, (d) a first buffer layer made of SiO2 and formed as a film between the electrode and the Ti diffused waveguide, and (e) a second buffer layer made of Si and formed as a film in a recess in the first buffer layer above at least part of the Ti diffused waveguide.

In particular, the first and second buffer layers are formed above the waveguide, and the first buffer layer made of $SiO_2$ and the second buffer layer made of Si to increase the waveguide propagation loss of light of the TE mode to substantially prevent the waveguide from propagating light of the TE mode therethrough, thereby achieving the object described above. As a waveguide type optical device which is an object of the present invention, for example, an optical modulator or an optical switch can be cited.

According to a further embodiment of the present invention, the second buffer layer is disposed at least above the Ti diffused waveguide in the proximity of an incoming side of light. On the other hand, the second buffer layer may alternatively be disposed at least above the Ti diffused waveguide in the proximity of an outgoing side of light. The constructions are employed in order to prevent propagation of light of the TE mode. The second buffer layer may be disposed on both of the incoming side and the outgoing side of light or over the entire area of the substrate.

According to a particular embodiment of the present invention, the second buffer layer has a thickness ranging approximately from 80 to 110 nm. The limitation in thickness is effective because the propagation loss of light of the TE mode is comparatively high within the range.

According to further particular embodiments of the present invention, the first buffer layer has, at a portion thereof above which the second buffer layer is disposed, a thickness of approximately 200 nm. The limitation in thickness of the first and second buffer layers to values within the ranges of the specific values is effective to make the waveguide less liable to guide light of the TE mode therethrough.

DETAILED DESCRIPTION OF THE PREFERRED EMBODIMENT

Figure 1:
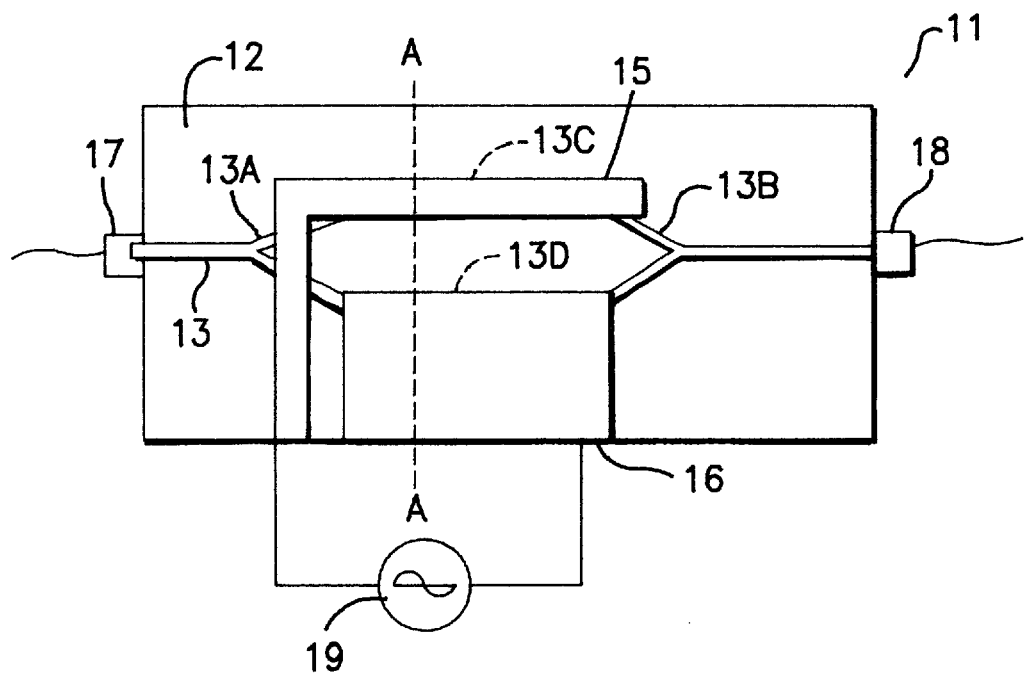
FIG. 1 is a plan view of a Mach-Zehnder type optical modulator used conventionally.
Figure 2:
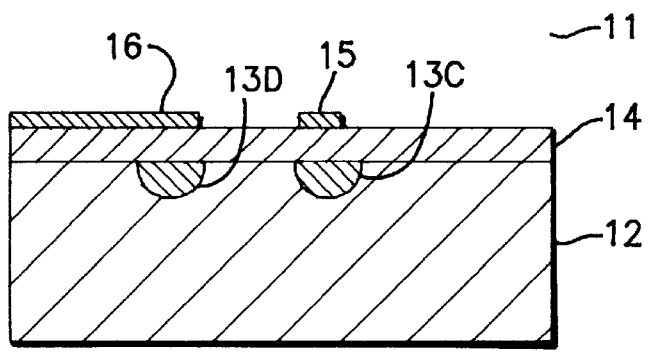
FIG. 2 is a sectional view of the Mach-Zehnder type optical modulator taken along line A–A' of FIG. 1.
Figure 3:
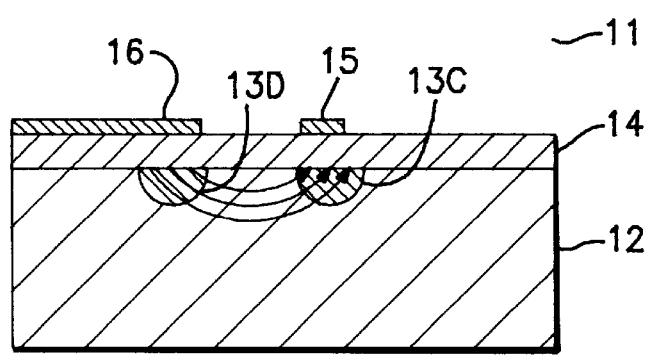
FIG. 3 is a sectional view showing the Mac-hZehnder type optical modulator when a voltage is applied by a driver circuit.
Figure 6:
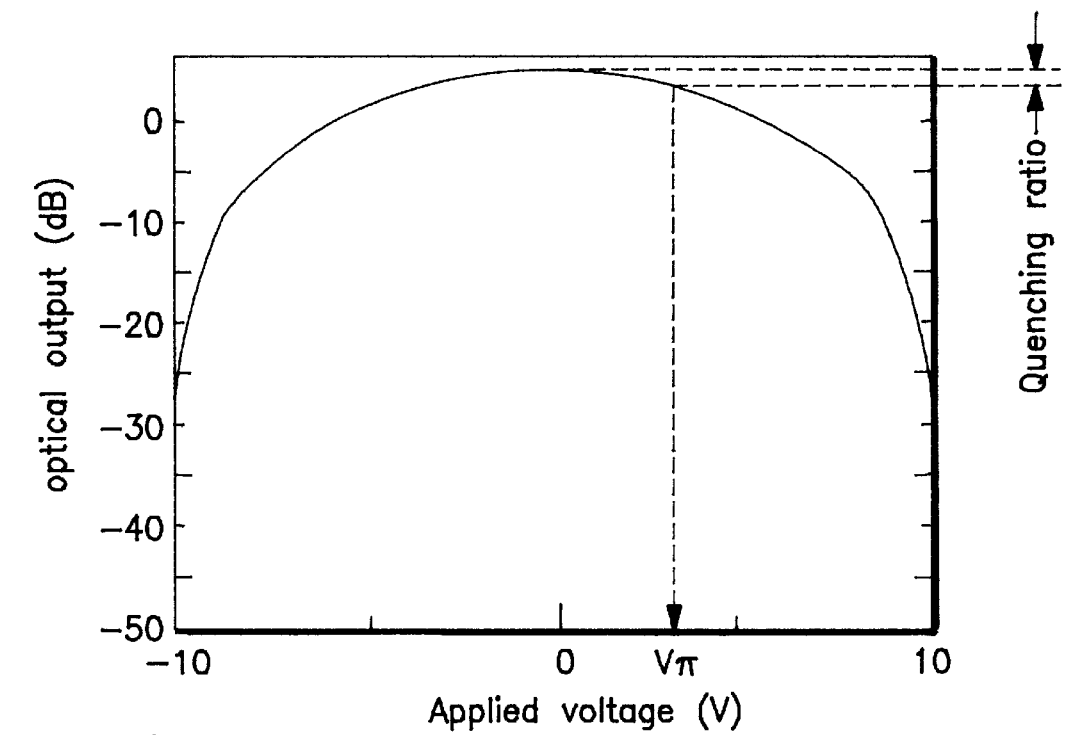
FIG. 6 is a characteristic diagram of the Mach-Zehnder type optical modulator when light of the TE mode is inputted.
Figure 7:
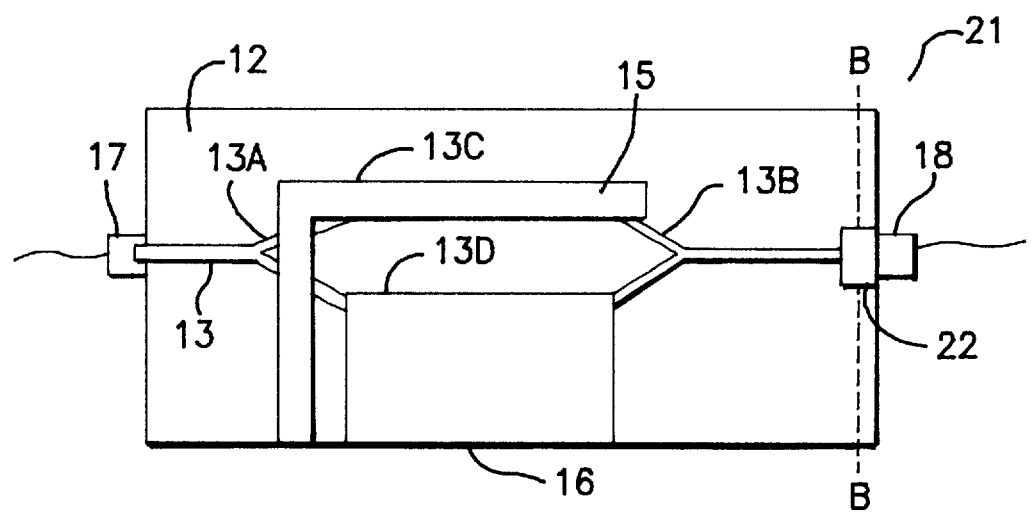
FIG. 7 is a plan view showing a Mach-Zehnder type optical modulator according to an embodiment of the present invention.

The present invention is described in detail below in connection with an embodiment thereof. In FIG. 7, the same elements as those in FIG. 1 are denoted by same reference numerals, and overlapping description thereof is omitted suitably. In waveguide type optical device 21 of the present embodiment, two branching portions 13A and 13B are disposed on waveguide substrate 12 and two parallel waveguide portions 13C and 13D are disposed at a central location of waveguide substrate 12 such that they form a Mach-Zehnder interferometer. Electrodes 15 and 16 in the form of a metal layer made of chrome and gold are formed on waveguide pair 13C and 13D, respectively. Input side optical fiber 17 is optically coupled to one of a pair of end faces of waveguide substrate 12. Meanwhile, Si buffer layer 22 is locally disposed in the proximity of the other end face of waveguide substrate 12, and output side optical fiber 18 is optically coupled to the end face adjacent to Si buffer layer 22.

Figure 8:
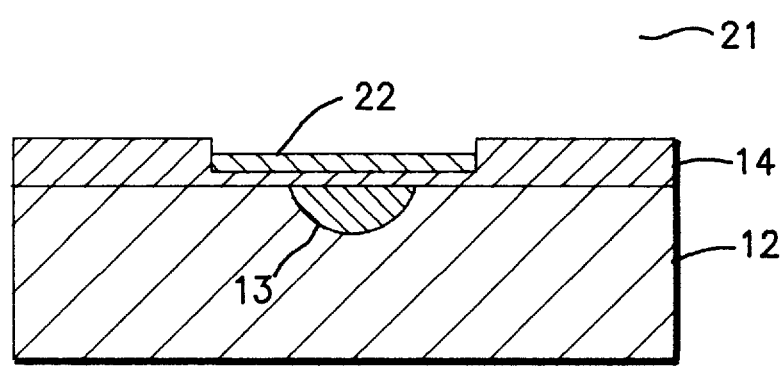
FIG. 8 is a sectional view taken along line B–B' of FIG. 7 showing a portion of the optical modulator in the proximity of an output side end face.

FIG. 8 is a sectional view taken along line B–B' of FIG. 7 and showing a portion of the waveguide type optical device in the proximity of the output side end face. In waveguide type optical device 21, $SiO_2$ film 14 is formed with the thickness of 1 $\mu$m over an entire area of waveguide substrate 12 as seen also in FIG. 8. However, in the proximity of the output side end face of waveguide type optical device 21, $SiO_2$ film 14 is etched by approximately 0.8 $\mu$m so that the thickness of the portion is 0.2 $\mu$m. Further, on the thus etched portion, a Si film is formed with approximately 95 nm, thick, and Si buffer layer 22 is formed from the Si film. This Si buffer layer 22 attenuated a TE component.

Figure 9:
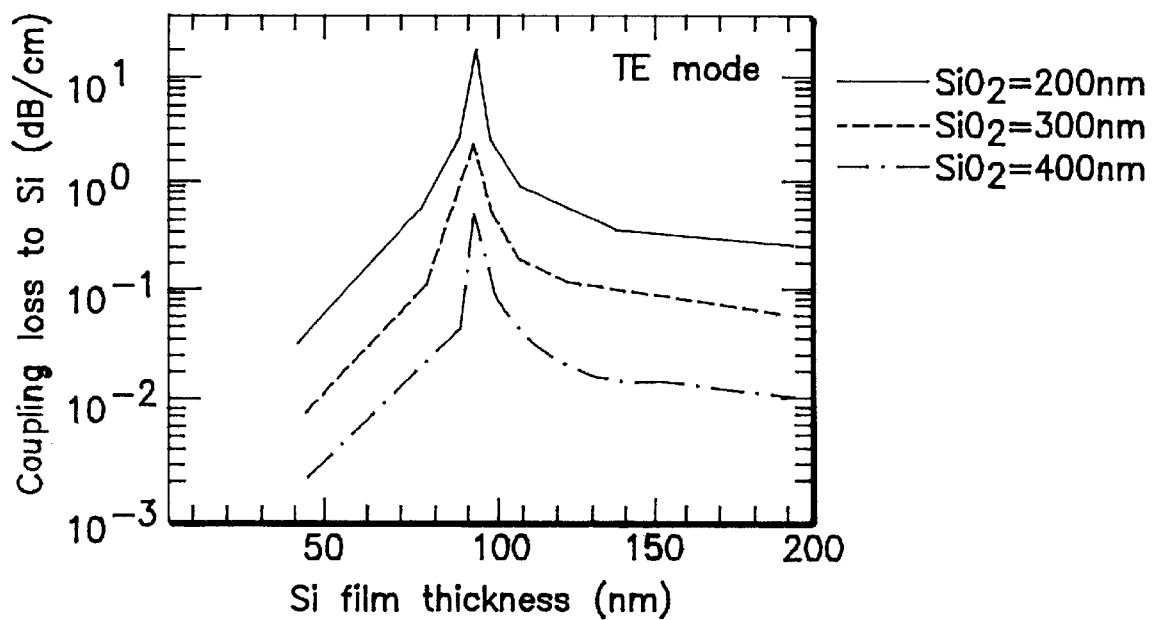
FIG. 9 is a characteristic diagram illustrating a relationship between the thickness of a Si film and the coupling loss in the TE mode.

FIG. 9 illustrates the relationship between the thickness of the Si film and the coupling loss in the TE mode. In the present embodiment, $SiO_2$ film 14 and Si buffer layer 22 which is formed from the Si film are formed on lithium niobate substrate (waveguide substrate) 12 as seen in FIG. 8 in the proximity of the output side end portion of waveguide substrate 12. Since Si has a higher refractive index than lithium niobate, light confined in the titanium-doped waveguide couples to the Si film, thereby producing a waveguide mode in the Si film to cause a polarization dependency of the loss. Generally, such a waveguide mode is more liable to be produced in the TM mode than in the TE mode.

In FIG. 9, coupling losses (propagation losses) in the TE mode with respect to the Si film thickness where $SiO_2$ film 14 has three values of 200 nm, 300 nm and 400 nm are shown. From FIG. 9, it can be seen that, where the thickness of the Si film is set to a value within a range from approximately 80 to 110 nm, preferably to approximately 95 nm, and the thickness of the $SiO_2$ film is set to approximately 200 nm, the coupling loss is substantially 20 dB/cm and the waveguide propagation loss in the TE mode exhibits its maximum value.

In order to produce waveguide type optical device 21 of the present embodiment, Ti (titanium) is formed as a film with the thickness of 45 nm, for example, on a Z-cut Y-propagation LN substrate, and an MZ waveguide is patterned and heated at 1,050° C. for 8 hours to perform thermal diffusion to form SiO2 film 14 on the waveguide, whereafter a predetermined portion is etched and a Si film is formed with the thickness of 95 nm at the location. Then, electrodes 15 and 16 of a metal film are formed directly above waveguide pair 13C and 13D, thereby completing waveguide type optical device 21. For example, Ti may be used for electrodes 15 and 16.

Figure 4:
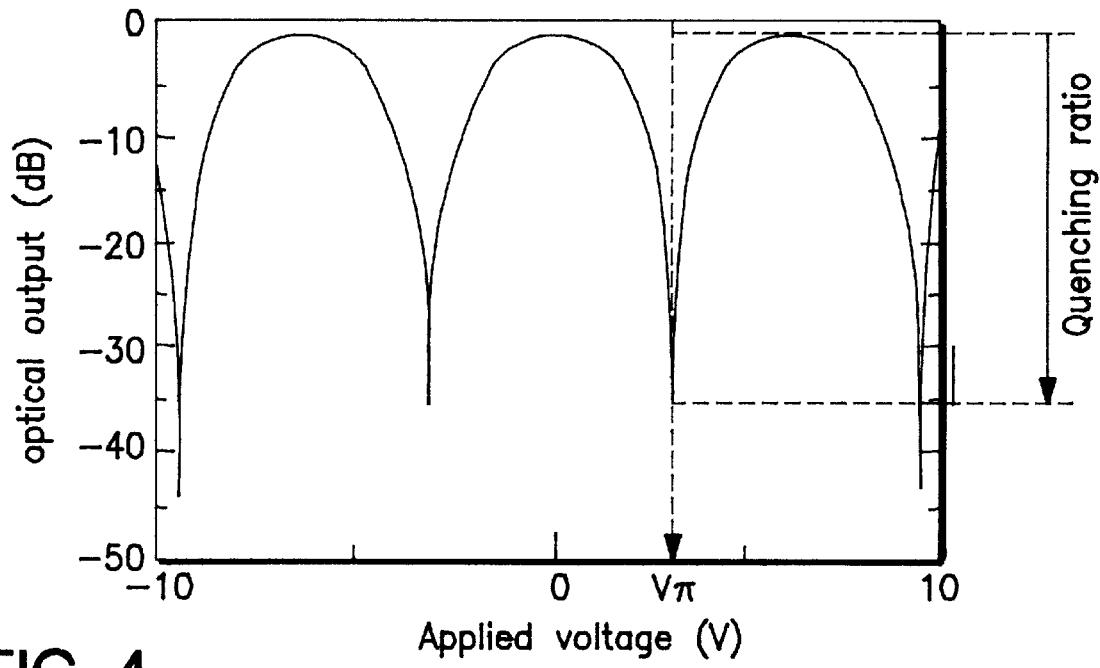
FIG. 4 is a characteristic diagram of the Mach-Zehnder type optical modulator when light of the TM mode is inputted.
Figure 5:
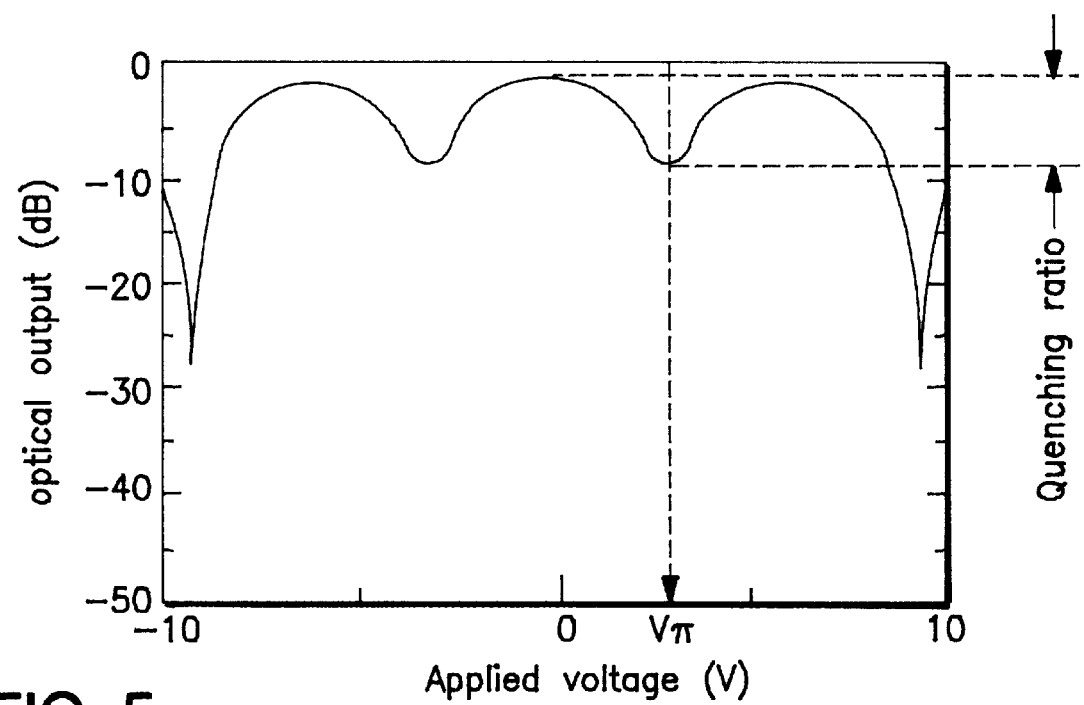
FIG. 5 is a characteristic diagram of the Mach-Zehnder type optical modulator when light of a mixed mode of the TM mode and the TE mode is inputted.
Figure 10:
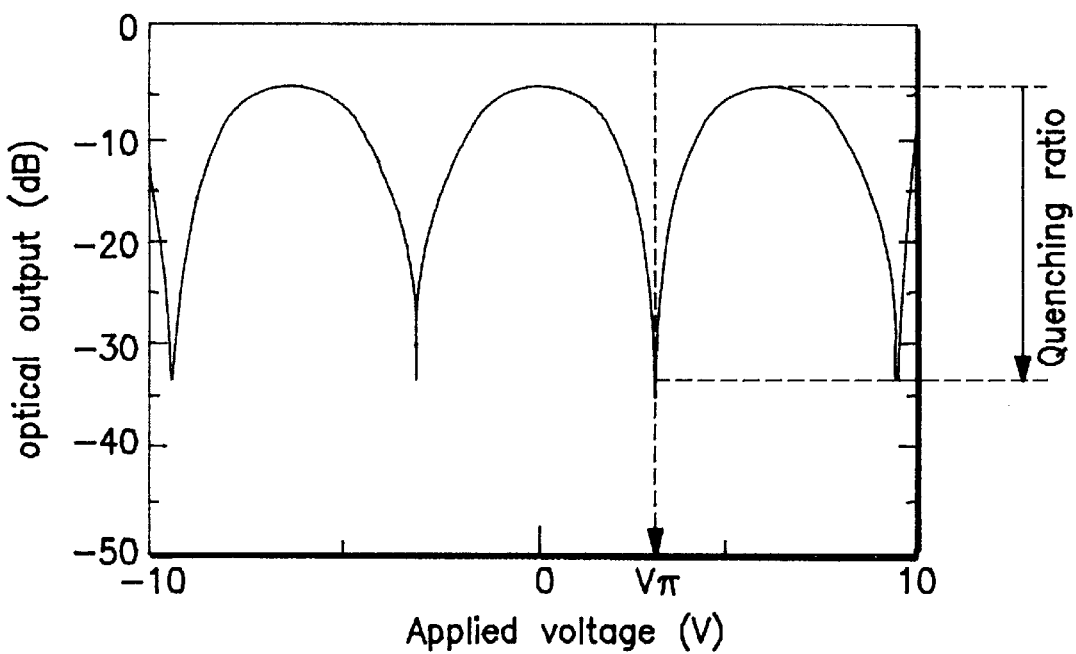
FIG. 10 is a characteristic diagram of the waveguide type optical device of the present embodiment when light of a mixed mode of the TM mode and the TE mode is inputted.
Figure 11:
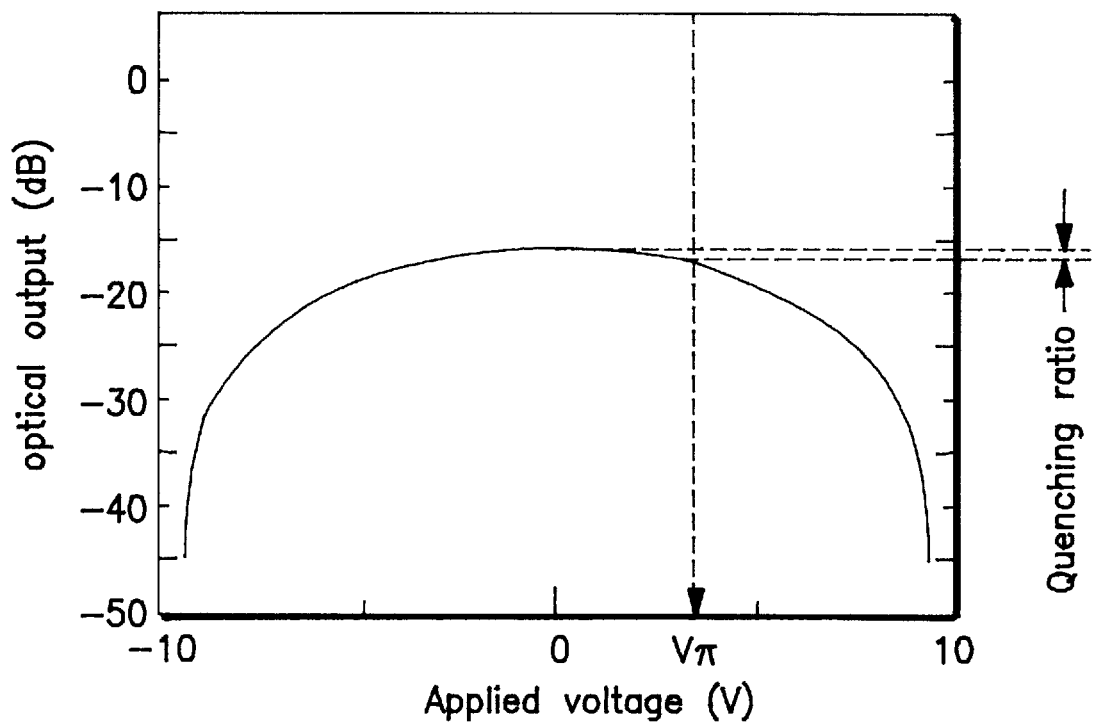
FIG. 11 is a characteristic diagram of the waveguide type optical device of the present embodiment when light of the TE mode is inputted.

FIG. 4 described hereinabove illustrates a characteristic when light of the TM mode is inputted to the waveguide type optical device of the present embodiment produced in such a manner as described above, and FIG. 10 illustrates another characteristic when light of a mixed mode of the TM mode and the TE mode is inputted. Meanwhile, FIG. 11 illustrates a further characteristic when light only of the TE mode is inputted. Those figures illustrate the characteristics when 0±10 V is applied for modulation. In waveguide type optical device 21 of the present embodiment, when the mode of the polarization of incoming light changes from the TM mode (FIG. 4) to a mixed mode of the TM mode and the TE mode (FIG. 10), the quenching ratio can almost be maintained although some deterioration in insertion loss occurs. In the prior art, when the mode of the polarization of incoming light is displaced from the TM mode, also the quenching ratio greatly decreases as the deterioration of the insertion loss increases as seen from FIG. 5 which corresponds to FIG. 10.

Accordingly, in conventional Mach-Zehnder type optical modulator 11, when a pulse waveform is transmitted, a variation in polarization of incoming light makes difficult the recognition of the H (high) level and the L (low) level of optical pulses to be modulated, particularly the recognition of the L level, and consequently, the possibility that a transmission error may appear is high. However, with the optical modulator formed from waveguide type optical device 21 of the present embodiment, even if the polarization of incoming light fluctuates, the H level and the L level can be recognized sufficiently. Accordingly, appearance of a transmission error by fluctuation of the polarization of incoming light can be prevented sufficiently.

Figure 12:
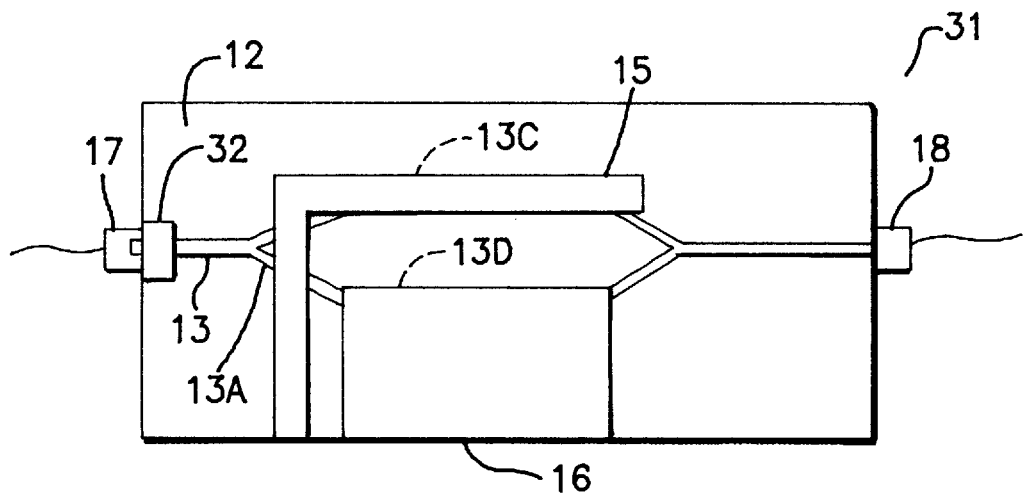
FIG. 12 is a plan view showing a first modification to the waveguide type optical device of the present embodiment.

FIG. 12 shows a first modification when a Mach-Zehnder type optical modulator is formed from a waveguide type optical device of the present invention. In FIG. 12, same elements as those of FIG. 7 are denoted by same reference numerals, and overlapping description of them is suitably omitted. In waveguide type optical device 31 of the first modification, Si buffer layer 22 disposed in the proximity of the output side end portion of waveguide substrate 12 in the embodiment described above is replaced by Si buffer layer 32 disposed in the proximity of the input side end portion of waveguide substrate 12. Similar effects can be obtained even where Si buffer layer 32 is disposed on the input side of light in this manner.

Figure 13:
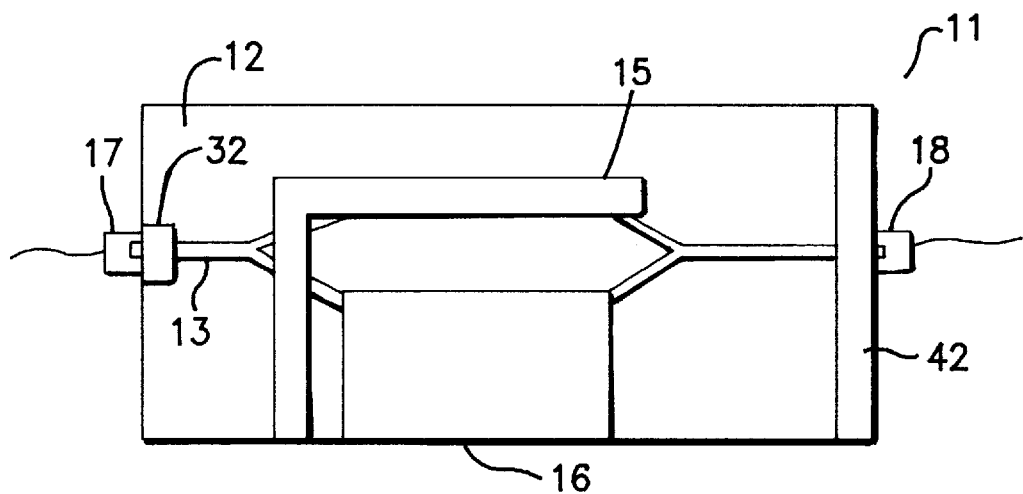
FIG. 13 is a plan view showing a second modification to the waveguide type optical device of the present embodiment.

FIG. 13 shows a second modification when a Mach-Zehnder type optical modulator is formed from a waveguide type optical device of the present invention. In FIG. 13, same elements as those of FIG. 7 are denoted by same reference numerals, and overlapping description of them is suitably omitted. In waveguide type optical device 41 of the second modification, Si buffer layer 22 disposed locally in the proximity of the output side end portion of waveguide substrate 12 is replaced by Si buffer layer 42 formed from a Si film like a belt over the entire area in the widthwise direction. Further, in the proximity of the input side end portion of waveguide substrate 12, Si buffer layer 32 is disposed in a similar manner as in FIG. 12. Similar effects can be obtained even where Si buffer layers 42 and 32 are disposed on both of the incoming side and outgoing side of light in this manner. Naturally, such Si buffer layers may be disposed over the entire area of waveguide substrate 12.

While, in the embodiment and the modifications described above, an optical modulator is formed from a waveguide type optical device, the present invention can be applied similarly to any other optical device which employs lithium niobate. For example, also where the present invention is applied to an optical switch or an optical filter, a stabilized optical signal can be obtained from unstable incoming polarized light.

As described above, in the present invention the first and second buffer layers are formed above the waveguide, and the first buffer layer made of SiO2 and the second buffer layer made of Si increase the waveguide propagation loss of light of the TE mode to substantially prevent the waveguide from propagating light of the TE mode therethrough. Consequently, the waveguide type optical device can maintain a stable characteristic even under an unstable environment of incoming light in which the polarization of the incoming light is not stabilized to the TM mode. Accordingly, a transmission error originating from the waveguide type optical device is less liable to occur, which can remarkably contribute to enhancement of the transmission quality.

According to the further embodiments of the present invention, since the second buffer layer is disposed above the waveguide on the incoming side or the outgoing side of light, incidence or emergence of polarized light of the TE mode can be inhibited efficiently.

It is to be noted that, where the Si film is disposed on the incoming side of light, a fluctuation of the polarization of inputted light can be absorbed. When, where the Si film is disposed on the outgoing side of light, the fluctuation of the polarization of inputted light is suppressed by another method than the method wherein the Si film is disposed on the incoming side of light, a fluctuation of the polarization which is produced in the inside of the device (produced when the light passes the waveguide) can be absorbed. Further, where the Si film is formed not only on the one face but over the entire area, the effects which are achieved where the Si film is formed on the incoming side and where the Si film is formed on the outgoing side can be achieved, and besides the Si film can be used also as a film for improvement in temperature characteristic.

Further, according to a further embodiment of the present invention, since the second buffer layer has a thickness ranging approximately from 80 to 110 nm, the transmission loss of light of the TE mode can be set high. Also according to the present invention, since light of the TE mode is guided and leaks into the buffer layer, the propagation of the light of the TE mode can be prevented effectively.

What is claimed is:

1. A waveguide type optical device, comprising:

a lithium niobate substrate;

a Ti diffused waveguide formed in said lithium niobate substrate;

an electrode formed on said Ti diffused waveguide for applying an electric field to said Ti diffused waveguide;

a first buffer layer made of $SiO_2$ and formed as a film between said electrode and said Ti diffused waveguide; and a second buffer layer made of Si and formed as a film in a recess in at least part of said first buffer layer above said Ti diffused waveguide.

2. A waveguide type optical device as claimed in claim 1, wherein said recess is in the proximity of an incoming light side of the device.

3. A waveguide type optical device as claimed in claim 1, wherein said recess is in the proximity of an outgoing light side of the device.

4. A waveguide type optical device as claimed in claim 1, wherein said second buffer layer has a thickness ranging approximately from 80 to 110 nm.

5. A waveguide type optical device as claimed in claim 3, wherein said first buffer layer has, at said recess, a thickness of approximately 200 nm.

6. A waveguide type optical device as claimed in claim 4, wherein said first buffer layer has, at said recess, a thickness of approximately 200 nm.

7. A waveguide type optical device as claimed in claim 1, wherein said recess and said second buffer layer are horizontally separated from said electrode.

8. A waveguide type optical device as claimed in claim 1, wherein said first buffer layer has a first thickness beneath said electrode, and a second, smaller, thickness in said recess.

9. A waveguide type optical device, comprising:

a lithium niobate substrate;

a Ti diffused waveguide horizontally disposed in said substrate and having an input part and an output part;

a first $SiO_2$ buffer layer on said substrate over said waveguide;

an electrode on said buffer layer over said waveguide for applying an electric field to said waveguide; and a second Si buffer layer on a portion of said first buffer layer separated horizontally from said electrode and over a portion of at least one of said input and output parts of said waveguide, for attenuating a TE component of light in said waveguide.

10. The device of claim 9, wherein said first buffer layer has a first thickness beneath said electrode and a second thickness beneath said second buffer layer, said second thickness being less than said first thickness.

11. The device of claim 10, wherein said first thickness is about 1 micrometer and said second thickness is about 0.2 micrometers.

12. The device of claim 11, wherein said second buffer layer has a thickness of 80 to 110 nanometers.

* * * * *